US006586942B2

(12) United States Patent
Lam

(10) Patent No.: US 6,586,942 B2
(45) Date of Patent: Jul. 1, 2003

(54) HAND MOUNTED CONTROL APPARATUS

(76) Inventor: Peter Ar-Fu Lam, 20104 Wayne Ave., Torrance, CA (US) 90503

( * ) Notice: Subject to any disclaimer, the term of this patent is extended or adjusted under 35 U.S.C. 154(b) by 33 days.

(21) Appl. No.: 09/896,434

(22) Filed: Jun. 29, 2001

(65) Prior Publication Data

US 2003/0001578 A1 Jan. 2, 2003

(51) Int. Cl.[7] ........................ G01N 27/416; A63H 30/00
(52) U.S. Cl. .......................................... 324/426; 446/26
(58) Field of Search .......................... 320/107; 324/426; 345/158, 156; 606/27, 32, 40; 361/232; 446/26; 439/37; 46/45, 243 M

(56) References Cited

U.S. PATENT DOCUMENTS

| | | | | | |
|---|---|---|---|---|---|
| 3,949,517 | A | * | 4/1976 | Reiner et al. | 439/37 |
| 4,529,389 | A | * | 7/1985 | Kennedy et al. | 446/26 |
| 4,820,229 | A | * | 4/1989 | Spraggins | 446/26 |
| 6,126,373 | A | * | 10/2000 | Yee et al. | 414/5 |
| 6,128,004 | A | * | 10/2000 | McDowall et al. | 345/156 |

* cited by examiner

*Primary Examiner*—Gregory J. Toatley, Jr.

(57) ABSTRACT

A control apparatus configured to supply power to an article of sales through the finger contact of the article. The embodiment includes interfacing circuit for signals to communicate between the control apparatus and the article of sales when said article is picked up by the fingers of an user.

32 Claims, 9 Drawing Sheets

HAND MOUNTED CONTROL APPARATUS

FIELD OF THE INVENTION

The present invention relates to a control apparatus that interfaced with a hand held miniature electronics article.

BACKGROUND OF THE INVENTION

Traditional portable electronics/electrical devices such as electrical tools or toys draw power from the batteries installed inside the devices. The number of batteries required depends on the working voltage specified by the circuit utilized. For many electronics circuits, three batteries are needed to provide a typical working voltage between 3V to 4.5V. The working voltage required by many microcontroller chips are in between 3V to 6V. In order to provide a reasonable working battery life to a device drawing a current over 100 mA, such as the products that comprise a light bulb, motor or speaker, the size of the batteries selected are typically of AA, C or D size batteries. These batteries not only add considerable weight to the device, it limits the ability of the designer to shrink the product size. It is the objective of this invention to provide a cordless system that does not required bulky batteries to be built inside a hand held article of sales.

SUMMARY OF THE INVENTION

The present invention is firstly directed to a hand held article of sales having an electrical circuit. This electrical circuit may include an electricity to light transducer such as light bulb or LED. It may comprise a motor to provide motion output. Alternatively, it may also include a speaker to generate sound, music or voice messages. The circuitry may also include other different kinds of applications circuits such as a design to identify itself from other articles of the same family. The first characteristics of this hand held article is that there is no battery installed inside the body of the article. Accordingly the size, weight and cost of the article are reduced. At least two conductive contact terminals are provided on two different locations of the article, preferably at the two sides, suitable to be held by the index finger and the thumb of a human hand. When electrical power is fed through these conductive contact terminals, the internal electrical circuit is activated. In order to feed power to this hand held article, a separated controller compartment having mating contact terminals connecting to a power source and/or appropriate interfacing circuits are provided. In a preferred embodiment, these contact terminals are specially designed for attaching to the fingers of an user's hand, such as the thumb and the index finger. Alternately, a structure is provided enabling the motion of the index finger and a thumb to position two contact terminals of the controller to the target article. When the user picks up the article, the mating contact terminals located at the fingers touch the conductive contact terminals of the article. Accordingly power is provided to the electrical circuit of the article through the finger contact action. When the electrical circuit of the article is powered and activated, it may generate responses such as light, motion or sound according to the nature of the electrical circuit built inside the article.

The finger contact terminals are wired to the compartment that provides the power source required. This compartment can be attached to the hand, the wrist, the arm, the waist, attached to any other location of the human body or kept inside a pocket. A velcro tape is preferred for fast attachment of the compartment to the human body. The actual power source may also be represented by one or more energy storage device, such as batteries, or a wall mounted adapter. For a louder sound to be generated, the small speaker installed at the miniature size article can be replaced by a larger speaker and relocated to the power supply compartment. In this case, the audio signal may be either obtained from a circuit built inside the article, then amplified in the controller compartment to drive the larger speaker. Alternately the electrical circuit embedded inside the target article may send a trigger signal to the sound chip located inside the controller compartment for driving the speaker. If three pairs of finger contact terminals are provided to bridge between the article and the control compartment, the audio signal and the battery connection circuit may share a common wire. If only two pairs of contact terminals are provided, the AC audio signal may be superimposed onto the DC power supply line, for the circuit to share the two conducting wires.

In the application when the audio signal is provided by the control circuit located inside the controller compartment, the electrical circuit located inside the target article provides an identity or a triggering signal to the control circuit through the finger contacts. Accordingly, different sounds may be generated from the compartment control circuit according to which external article is picked up by the finger contacts. In addition to sound, other supporting circuits such as a display panel, LEDs and/or control buttons can be added to the compartment to provide additional features for enriching the product package.

The wires connecting in between the finger contacts and the compartment are preferably to be flexible, or adjustable to suit for different hand sizes. The finger contact terminals can be designed to be part of a ring, a finger cap, or a glove for attaching to the tips of a finger. In order to avoid accidental short circuiting the power source when the two finger contact terminals are touching each other, a short circuit sensor, and/or other protection circuit such as analog to digital (A/D) feed back circuit, a current limiter, a fuse or a high current shut down circuit can be provided to prevent any short circuit hazard. Alternately, a finger tip contact terminal can be structured only for touching the contact terminals of the target articles but not the adjacent finger tip contact terminal. For example, each finger tip contact terminal can be protected by a protruded non-conductive wall so that two finger tip contact terminals are not allowed to touch each other. However, the mating conductive contacts on the article side can be formed to provide a smaller protruded shape so that they are free to be contacted by the finger contact terminals.

Preferably a family of different target articles having similar contact designs are to be provided to enrich the value of the package. A first preferred embodiment of the article is a miniature flashlight having a light bulb or a LED connected to two contact terminals located at the opposite sides of the flash light. When the fingers pick up the flashlight, electricity is provided from the battery compartment, conducted through the contact terminals for lighting up the light bulb or the LED. A modification of the concept is to provide a light bulb or LED inside a flying object such as a dart, a ball, or any other projectile object. An energy storage device such as a miniature battery or a capacitor can be built inside this projectile object to continuously light up the LED after the flying object left the hand of the user. The energy storage device will continue to light up the light bulb or LED for a short period of time after external power is discontinued.

Other embodiments of the article include different toy articles, such as dolls, action figures, toy characters, toy size wheeled vehicles, airplane, helicopter, or toy size electrical hand tool. A motor is included in many of these toy articles to provide motion response when the target article is picked up. It should be noted that although many toy articles such as the wheeled vehicles should be miniature reproductions of the life size products, the application of the invention on electrical tools can be extended to regular life size tools.

In the case the target article is a member of a toy family, such as dolls, wheeled vehicles or action figures, an identifying circuit can be built inside the toy to differentiate one member of the family from another. When the toy is picked up, the interface and/or controller circuit inside the compartment read the identifying signal from the toy. The nature of the toy is then identified by a detection circuit. Different voices, visual displays, motions or interactive responses tailor designed for that particular toy member may be generated. A simple way of embedding an identifying circuit inside the toy is to provide a specified valued electrical component such as a resistor or a capacitor. When the toy is in contact with the user's fingers, the value of the resistor or capacitor is measured by the interfacing circuit and/or the controller located inside the controller compartment. Different component values, each represents a different toy, directs the controller to provide different voice or interactive responses. Typical interfacing circuit capable of identifying a resistor value such as A/D converter, comparator circuit or bridge circuit are applicable to serve this application. Allowing all the different toys to share the same power source located at the controller compartment is another distinctive benefit of the invention.

A further enhancement of the invention is to provide a toy for the children to explore the electrical characteristics of different external objects, or materials. In a preferred embodiment, the resistance of the object contacted by the fingers are evaluated and responses are provided by voice, light or a message displayed on a visual area, such as a LCD panel. When a very low resistance is detected, the response can be: "This is a metal". When a very high resistance is read, the response is "This is not conductive." When a medium resistance is read, the unit response: "Is it a human skin?". When low to medium resistance is detected, the response may be "It feels wet?". Alternately, a tone can be generated and the frequency or volume of the tone can vary according to the resistance or capacitance detected by the two finger contact terminals.

This figure tip exploring device can also be configured to become a battery tester. When the finger contact terminals are placed across a battery, the controller and interface circuit inside the compartment detects an external voltage. The initial voltage is first read. The battery voltage is then connected to a predefined load and the loaded voltage is read again. The comparison between a no load voltage and a loaded voltage will indirectly reflects the strength of the battery under test. The result can be announced by voice, or visually represented by a meter, LED indicator or LCD display.

The novel features of the invention are set forth with particularity in the appended claims. The invention will best be understood from the following description, when read in conjunction with the accompanying drawings.

DETAILED DESCRIPTION

Figure 1:
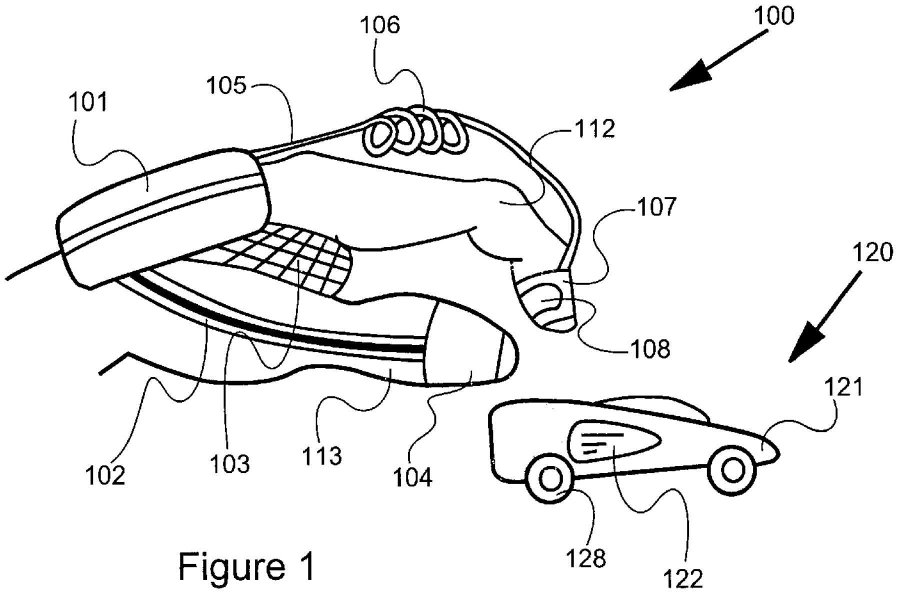
FIG. 1 illustrates an embodiment of the hand attached controller and the target toy car to be contacted by the finger contacts of said controller.

Attention is initially directed to FIG. 1 which depicts the combined application of a controller embodiment 100 and an article of sale embodiment 120 in accordance with the invention. The controller 100 comprises a compartment 101, a velcro tape 103 to attach the compartment 101 to a human hand; two finger caps 104, 107 for attaching to the thumb 113 and the index finger 112. On each of the finger cap is a conductive contact terminal 108. Each contact terminal is connected to the compartment 101 by conducting wires 105 and 102. The conductive wire 105 has a flexible; elastic or coiled segment 106 for adjusting the distance between the finger cap 107 and the compartment 101. Alternately, the exposed length of the wire 102 can be adjusted by hiding some segment of the wire inside the compartment 101. Inside the compartment 101 are batteries that provide power to the external target article, the toy car 121. Two contact terminals 122 are positioned at the two sides of the toy car 121 such that when the car is picked up by the fingers 112, 113, each contact terminal 108 make contact with the corresponding contact terminal 122 of the car and provide power to the electrical circuit inside the car. A motor linked to the wheels of the car is provided inside the car. The terminals of this motor are connected to the contact terminals 122. As soon as the finger contact terminals 108 touches the contact terminals 122, the motor is powered by the batteries inside the compartment and starts to run. Alternately an electricity to light transducer such as LED is included inside the car. The LED will be lit when the car is picked up. In an alternate embodiment the electrical circuit located inside the car is an identifying circuit which provide some electrical identification characteristics, the electrical circuit inside the compartment picks up the identification through the finger contacts and response with some sound effect appropriate with the characteristics of the target article, the car 121. For example, when an ambulance is picked up, a siren sound is generated. If an ice-cream retail van is touched by the fingers 112, 113, a music box type of melody is played.

Figure 2:
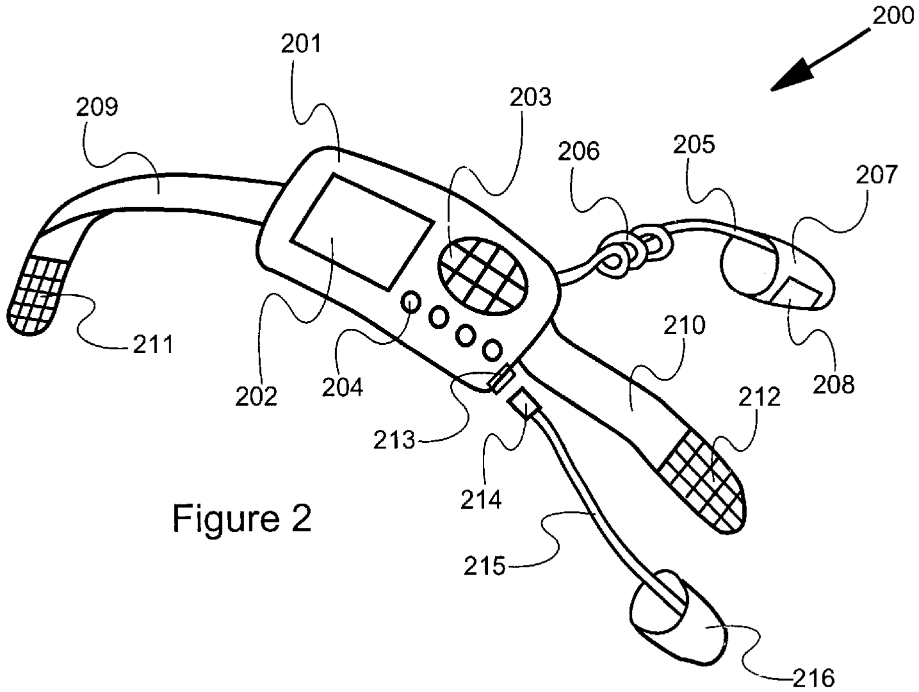
FIG. 2 illustrates another preferred embodiment of said hand attached controller.

Attention is now directed to FIG. 2 which illustrates another controller unit 200. On top of the compartment 201 is a LCD display panel 202, a speaker area 203 and input buttons 204. Two segments of mounting tape 209 and 210 extends from the opposite sides of the compartment are provided for attaching the controller compartment to the hand of an user. Mating velcro segments at the ends of the tape 211 and 212 enable the compartment to be fitted with hands of different sizes. It should be noted that other than the hand, the compartment can be stored or attached to other many different parts of the human body. The controller compartment is linked with the contact terminals 207 and 216 by the conducting wires 205 and 215. At the end of the conducting wire 215 is a plug 214 which is configured to be plugged into the socket 213 for conducting electricity between the compartment and the finger tip contact terminals 208. More than one receiving locations of the plug 214 are possible for adjusting the exposed dimension of the wire 215.

Figure 3:
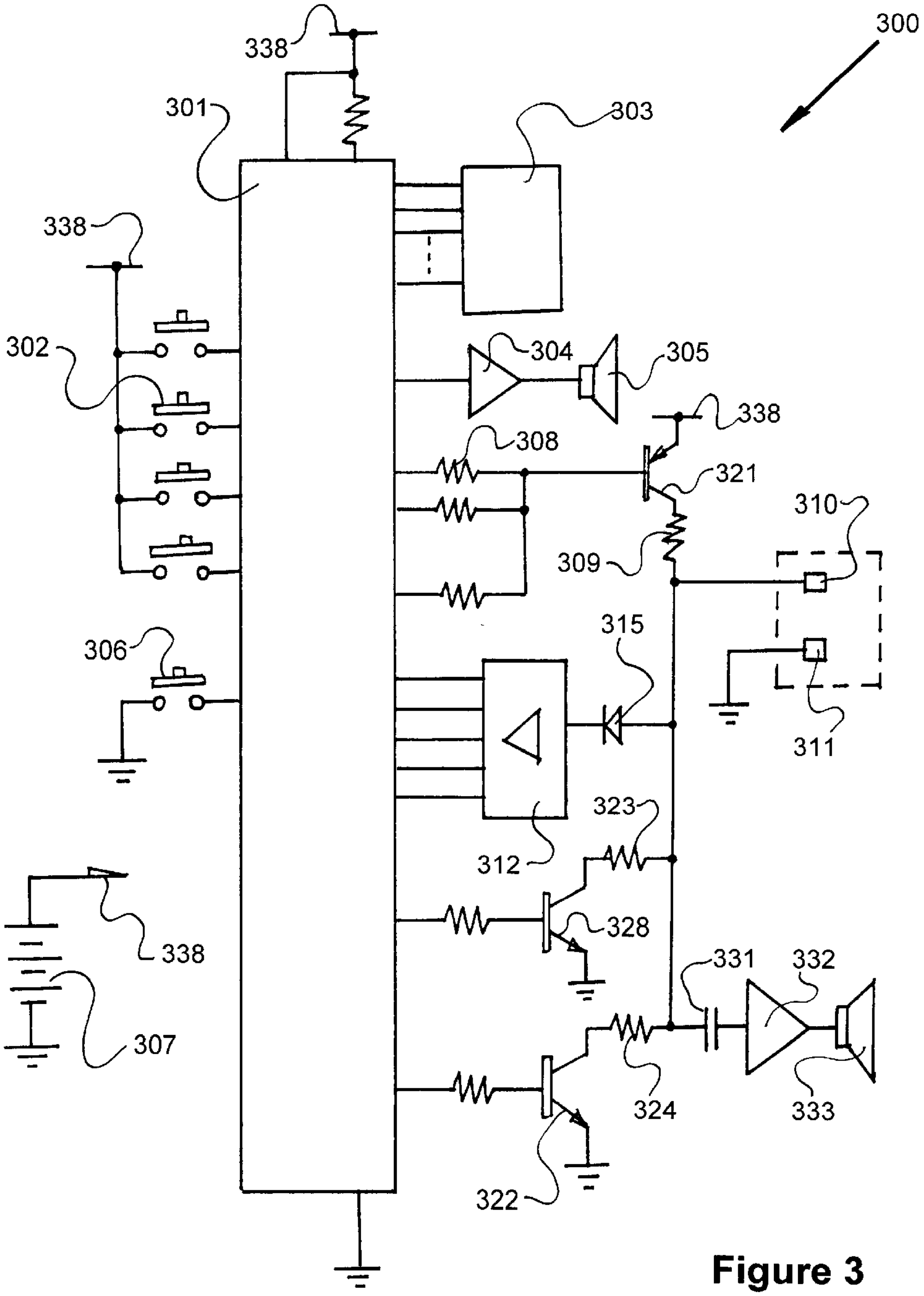
FIG. 3 is an embodiment of the control and interface circuit built inside a hand attached controller.

FIG. 3 illustrates an embodiment of the electrical circuit included inside the compartment 201 of FIG. 2. The compartment provides a power source represented by the batteries 307 connected to different power points 338 of the circuit. When the microcontroller 301 sinks current through the resistors 308, the transistor 321 is turned on and an electrical current is fed to the external target article through the contact terminals 310 and 311. Contact terminals 310 and 311 are represented by the contact terminals 108 as illustrated in FIG. 1. The amount of current provided to the target article is controlled by the amount of base current fed through the control resistors 308. These resistor may also works as a D/A (digital to analog) converter to translate digital signals provided by the microcontroller into an analog signal for feeding the external target article. Resistor 309 limits the amount of the current flowing through the contact terminals 310, 311 in case of excessive current drawn. The control buttons 204 of FIG. 2 are represented by the switches 302 of FIG. 3. Reset switch 306 is provided to reset the microcontroller 301 when required. The circuit also provides a LCD display unit 303 that is represented by the display panel 202 of FIG. 2.

In a different preferred embodiment, the controller 200 of FIG. 2 is configured to become a battery tester. When the finger tip contact terminals 216 are in contact with the terminals of a battery, this voltage is converted into digital readings by the A/D (analog to digital) converter 312 and then read by the microcontroller 301. The diode 315 protects the circuit when the battery polarities are inverted. The microcontroller may also turn on the transistors 328 and 322 to provide an artificial load to the external battery. The battery voltages at different loading conditions are analyzed and accordingly the power capacity of the battery is indicated on the display panel 303 or announced by the speaker 305.

In another embodiment, the external target article comprises of different members of a family of toys, each having an unique identifying circuit embedded inside the toy. When this identifying circuit, such as resistors of different unique values, is in contact with the contact terminals 310, 311, the A/D circuit 312 reads the value of the resistor. With a predefined resistance look up table built inside the software program, the microcontroller is able to identify the specific toy article picked up by the fingers 112, 113 of FIG. 1. Accordingly different voice message or interactive responses custom designed to the target article can be produced. Alternately, different custom designed visual messages can be displayed on the LCD panel 303.

In another further application, the external target article comprises an embedded voice chip. When the target article is powered up by the DC electrical current supplied by the transistor 321, an AC voice message can be generated and fed back to the contact terminals 310, 311. This AC voice message is filtered by the capacitor 331, amplified by the amplifier 332 and drives the speaker 333. In real world application, the two speaker driving circuits should be combined to save cost.

Figure 4A:
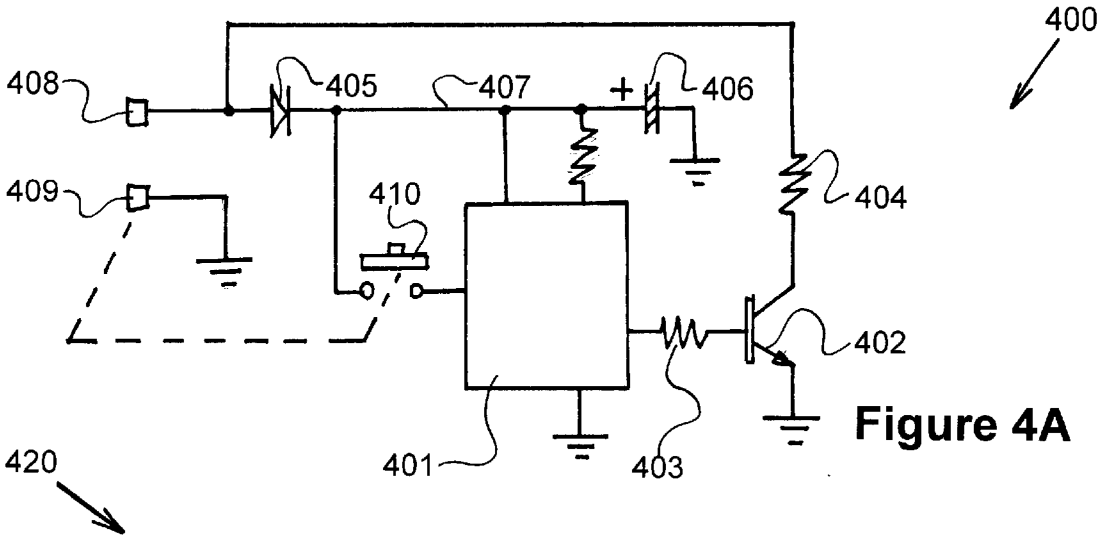
FIG. 4A is an embodiment of an interface circuit built inside an article of sales to be contacted by the mating contact terminals connected to a controller.
Figure 4B:
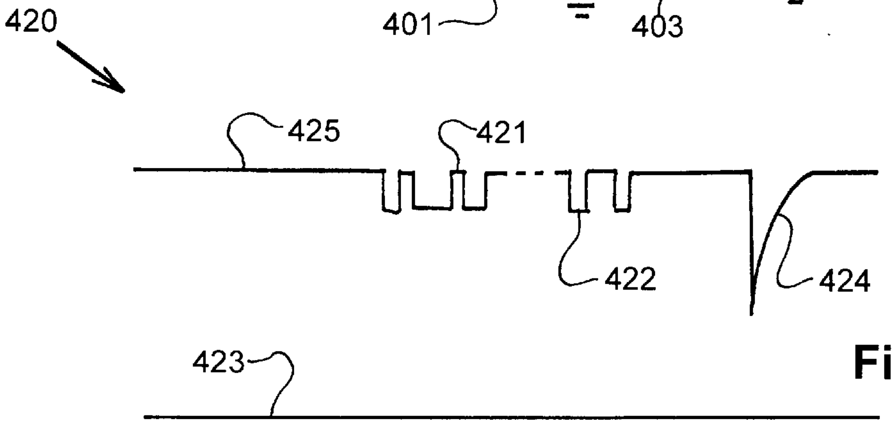
FIG. 4B is the waveform of the electrical current flowing through the contact terminals and the interface circuit of FIG. 4A.

Attention is now drawn to FIG. 4A illustrating a preferred embodiment of an electrical circuit 400 included inside the body of a target article. This circuit is able to generate digital signals when power is received. The digital signal can be used for signaling the identification of the target article or serve other applications. The contact terminals 408, 409 represents the conductive terminals positioned outside the target article, such as the contact terminal 122 of the toy car 121 in FIG. 1. The heart of the circuitry is a microcontroller 401. The microcontroller is powered by the external voltage obtained from terminals 408, 409. The capacitor 406 is included as a filter and also a power reservoir to store electrical energy when the contact terminals are momentarily out of contact. When power is connected to the contact terminals 408, 409, the microcontroller is powered up. At this moment, the voltage waveform across the terminals 408 and 409 is illustrated in FIG. 4B. Once the electrical circuit is stabilized, the microcontroller 401 generates a series of pulses 421 and 422 according to the nature of the target article. These pulses turns the transistor 402 ON and OFF and accordingly giving a pulsing loading to the power line through the resistor 404. The amplitude of the pulses 421 and 422 are determined by the value of the resistor 404 and the internal impedance of the interfacing facing circuit at the controller end. The pulses 421 and 422 are then processed by the electrical circuit at the controller end. Responses are generated according to the pulses detected. The diode 405 of FIG. 4A is included to attenuate the pulsing signal to enter the power supply line 407 of the microcontroller circuit.

In order to determine when the microcontroller 401 should generate pulses and what kind of pulses can be generated, a trigger switch 410 is included in the circuit 400. In many applications, the target article is accessed by only two fingers, which also provide the contact function to power up the chip. Therefore the switch 410 is preferably be integrally positioned right behind the contact terminal 409, so that the switch 410 can be triggered by the same finger accessing the contact terminal 409. Likewise, a controller switch is preferred to be linked to the mechanism of the controller side contact terminals such that this switch can be triggered by the same thumb and index finger controlling the movement of the controller side contact terminals. Another advantage of this design is that the electrical circuit can be set to a low power standby mode to conserve energy. The circuit is revoked to the normal operation mode only when this controller switch is triggered.

Figure 4C:
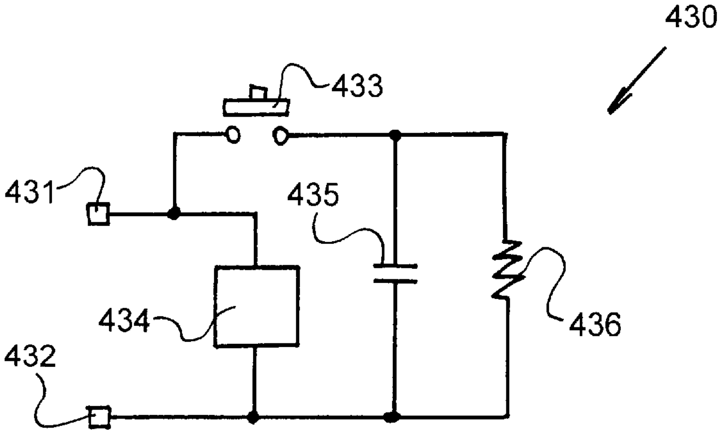
FIG. 4C is another interface circuit built inside an article of sales to be contacted by the mating contact terminals connected to a controller.

FIG. 4C illustrates another generic circuit applicable for the target article. The block 434 represents the loading circuit of the target article. It can be an analog circuit, a digital circuit or a programmable circuit. It can also be a simple loading circuit such as a motor, a light bulb or a LED. Triggering is provided by pushing the switch 433 which connect the capacitor 435 to the power line of the circuit. The capacitor 433 will provide a momentary negatively going triggering pulse 424 as shown in FIG. 4B. This trigger pulse will be useful to trigger the electrical circuit located at the controller end. The resistor 436 is included for discharging the capacitor 435 when the trigger switch 433 is released.

Figure 5A:
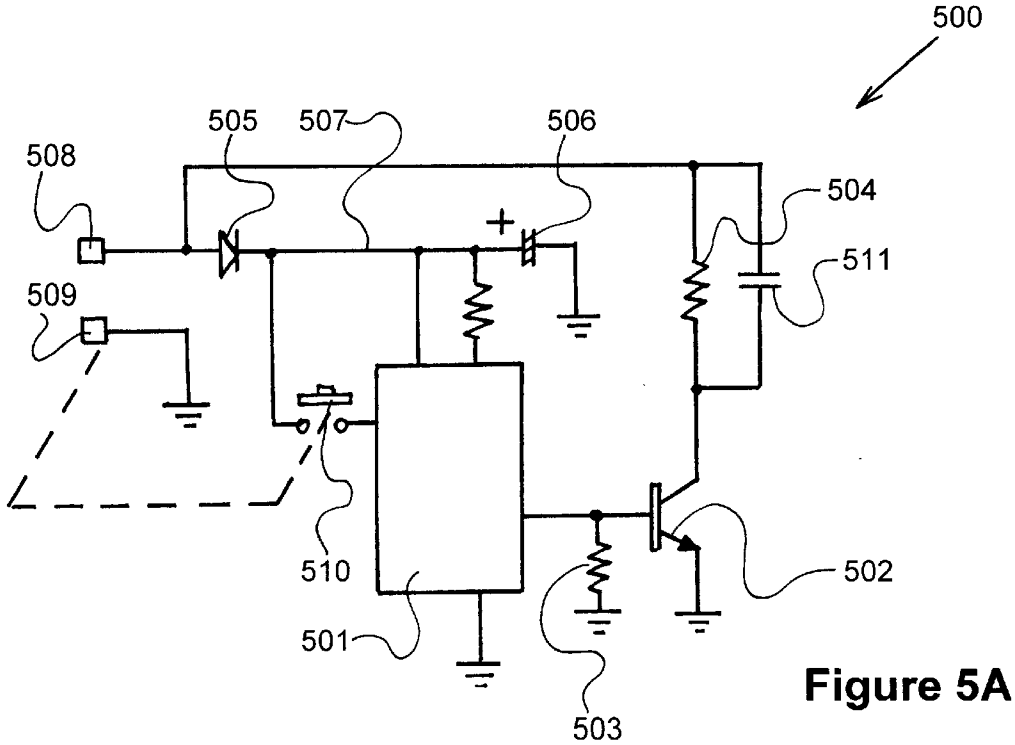
FIG. 5A is an example of a sound generating interface circuit built inside an article of sales.
Figure 5B:
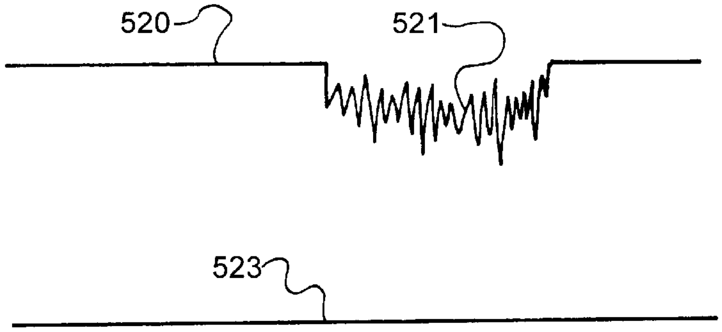
FIG. 5B is the waveform of the electrical current flowing through the contact terminals and the interface circuit of FIG. 5A.

FIG. 5A is a design alternative of FIG. 4A, wherein the functional block 501 generates an analog signal such as a voice waveform. This voice waveform is amplified by the transistor 502 and coupled to the contact terminal 508 by the capacitor 511. The DC voltage measured across the terminals 508 and 509 are represented by the voltage waveform 520 of FIG. 5B. The coupled AC signal is represented by the analog waveform 521.

Figure 6A:
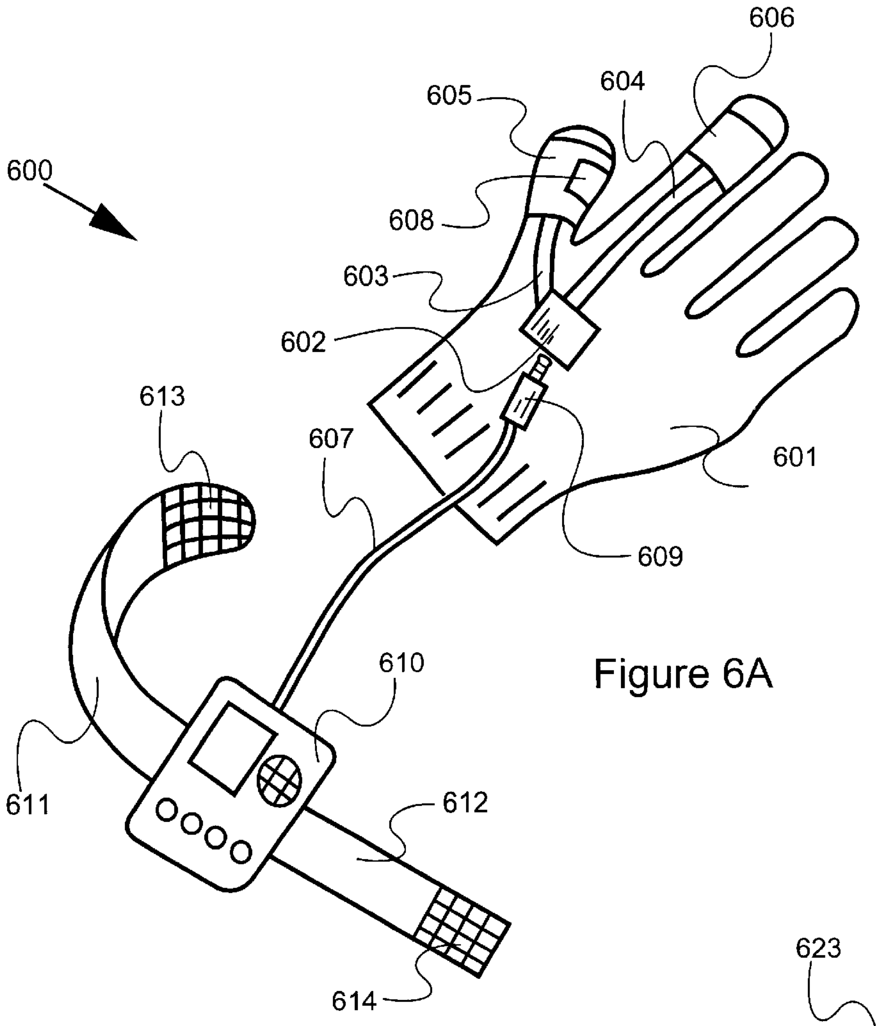
FIG. 6A illustrates another preferred embodiment of the controller.
Figure 6B:
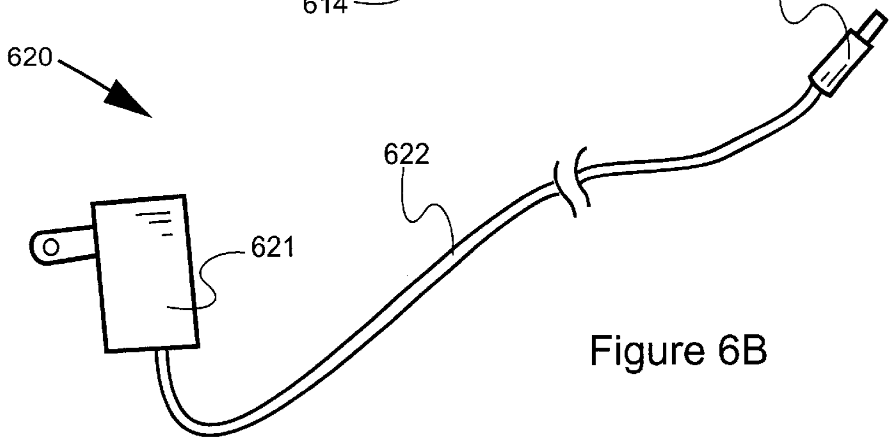
FIG. 6B illustrates an optional wall mounted adapter configured to provide power to the controller compartment.

An alternative preferred embodiment is illustrated in FIG. 6A having a glove 601 and a controller compartment 610. The controller compartment 610 is identical in nature to the controller compartment 201 of FIG. 2. The mounting tapes 611, 612 are structured to mount the controller compartment to the wrist or the arm of the user. The cable 607 connects the controller compartment to the finger contact terminals 608 located at the glove. An optional connector plug 609 and socket 602 are included for easier installation of the controller set. In case of an electric tool application, the controller compartment package 610 can be replaced by a simple battery box or the wall mounted adapter 620 of FIG. 6B. The plug 623 is simply connected to the socket 602 of the glove 601 to provide electricity to any electric tool picked up by the fingers 605, 606.

Figure 7A:
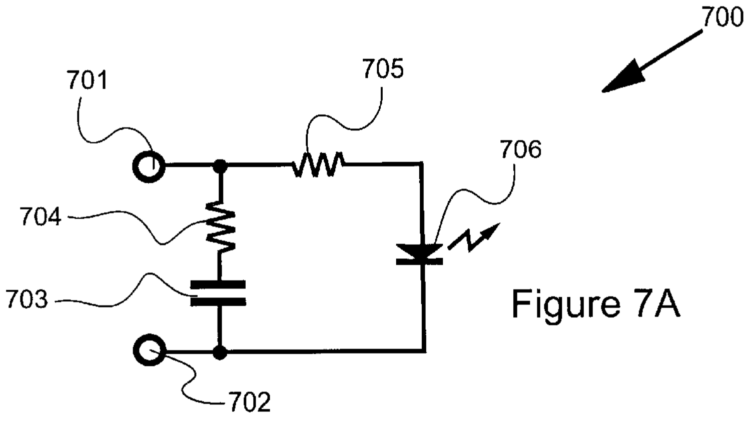
FIG. 7A is a light generating circuit build inside an article of sales.
Figure 7B:
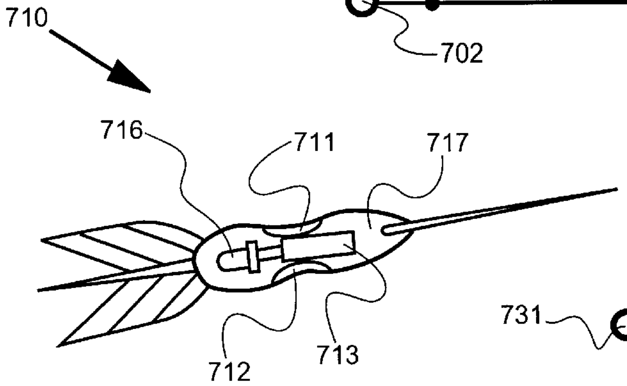
FIG. 7B illustrates the internal structure of a dart making use of the circuit illustrated in FIG. 7A.

Attention is now drawn to another preferred embodiment of the target article, the dart of FIG. 7B. The body 717 of the dart is made of a transparent or translucent material. Embedded inside the dart is a light emitting transducer 716 and an optional energy storage reservoir 713. At the two sides of the body are the conductive contact terminals 711 and 712 for conducting power to the internal circuit of the dart. FIG. 7A illustrates an embodiment of the circuit inside the dart. The light emitting transducer 716 is represented by the LED 706. The energy reservoir 713 is represented by the capacitor 703. The resistor 705 defines the intensity of the LED. The charging current of the capacitor 703 is limited by the resistor 704. The LED 706 is lit when finger contact provides electrical power to the contact terminals 711 and 712. The capacitor 703 is also fully charge up when the electrical power is maintained for one to two seconds. When the dart leaves the hand of the user, the LED continuously to be lit until the electrical power stored inside the capacitor 703 is used up. This design provides a beautiful tail light along the projectile of the dart. The lighted up dart not only enhance the fun of the game, but also makes it easier for a movie camera to capture the slow motion of the flying dart.

Figure 7D:
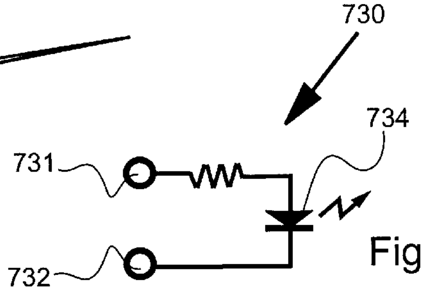
FIG. 7D illustrated a simple LED circuit build inside an article of sales.
Figure 7C:
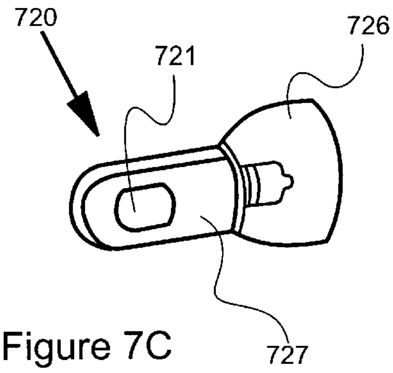
FIG. 7C illustrates a flashlight making use of the circuit illustrated in FIG. 7D.
Figure 7E:
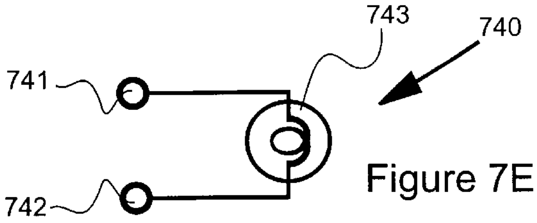
FIG. 7E illustrates a light bulb circuit built inside an article of sales.
Figure 7F:
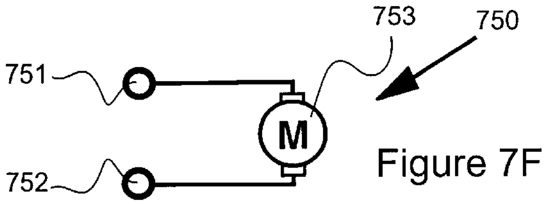
FIG. 7F illustrates a motor circuit built inside an article of sales.

FIG. 7C illustrates a miniature profile flashlight. It has a light emitting transducer 726 positioned in front of the body 727. At the two sides of the body 727 are the contact terminals 721 structured to receive power through the finger contact. It can be observed that the body of the flash light is very thin because no battery is required to be built inside the flash light. The light emitting transducer is represented by the LED 734 of FIG. 7D or the light bulb of FIG. 7E. Other than light emitters, the target article may include a motor 753 as illustrated in FIG. 7F to provide motion as soon as the user's fingers are in touch with the contact terminals of the target article.

Figure 8A:
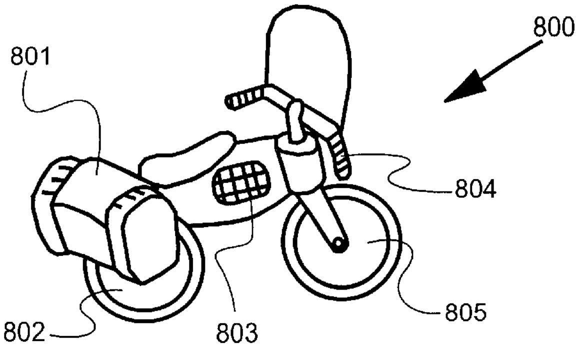
FIG. 8A is a toy motorcycle having a built in motor.

FIG. 8A illustrates a motorcycle 800, another wheeled motor vehicle designed with the invented technology. At the two sides of the motor cycle 800 are the contact terminals 803. A motor and a gear mechanism are installed inside the compartment 801 and linked to the wheel 802. The motor is connected to the contact terminals 803 as shown in FIG. 7F. As soon as the contact fingers pick up the motorcycle, the motor starts to rotate. The finger contact terminals extended from the controller compartment is preferred to be attached to the middle finger and the thumb. This is to free up the index finger for controlling the steering of the front wheel 805 and the steering mechanism 804.

Figure 8B:
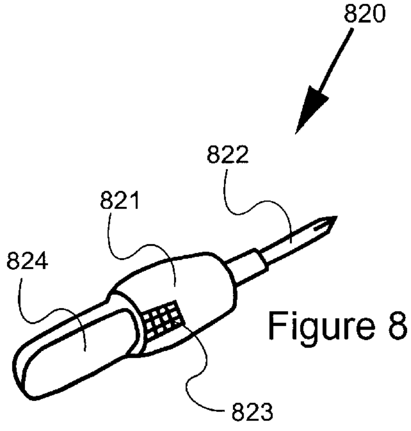
FIG. 8B is an electrical hand tool having a built in motor.

FIG. 8B is an electric screw driver 820, a hand tool example structured to interface with the finger contact power supply assembly. Inside the housing 821 is a motor and a gear box. The motor is connected to the contact terminals 823 located at the two sides of the housing. Since there is no built in battery, the handle of the screw driver is shrunk to a small size just adequate to be held by the hand of the user. As soon as the tool is picked up by the finger contact terminals, the screw driver starts to turn. This is a very handy way to start or stop a low voltage electrical hand tool by simply making contact with a finger. The benefits of this arrangement is that the weight of the electrical hand tools is lighter, the size is smaller and the cost is lower. It should be noted that the electrical hand tool can be a life size tool for regular jobs or a miniature toy grade hand held tool designed for kids only.

Figure 8C:
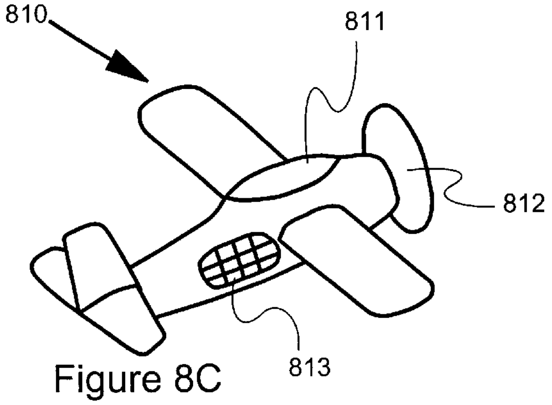
FIG. 8C is a toy airplane having a built in motor.

FIG. 8C is a toy airplane having a motor built inside the body 811. The motor is connected to the contact terminals 813 located at the two sides of the body 811. When the airplane is held by the power supply finger contacts, the propeller 812 which is linked to the motor starts to rotate for the kids to simulate a flying airplane.

Figure 8D:
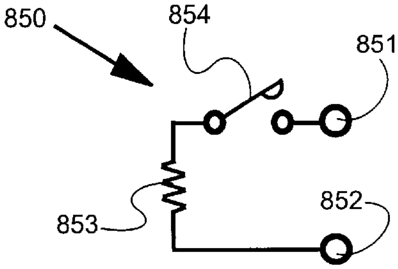
FIG. 8D is a circuitry having an identifying component connected to the contact terminals of a target toy.
Figure 8E:
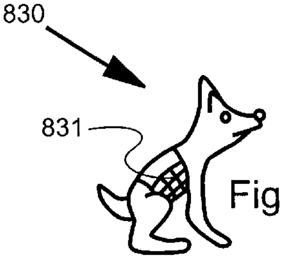
FIG. 8E is a toy pet having two contact terminals at both sides.
Figure 8F:
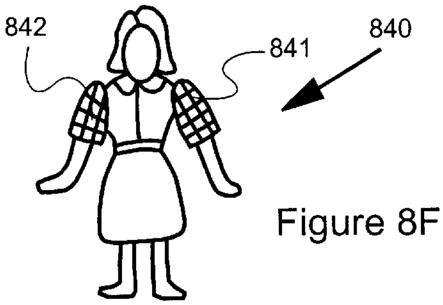
FIG. 8F is a doll having contact terminals at both sides.

FIG. 8E is a toy size dog 830 having two contact terminals 831 located at the two sides of the pet. Inside the torso of the dog is an identity circuit represented by a resistor as shown in FIG. 8D. When the dog is held by the finger contact terminals, the controller circuit reads the value of the resistor 853 which identify the presence of the dog. In response a barking sound can be generated to drive the speaker represented by 203 of FIG. 2 and 305 of FIG. 3. FIG. 8F is a doll equipped with a different resistor value. When the contact terminals 841 and 842 are touched by the finger contact terminals, the sound of a girl can be generated from the speaker 203 of FIG. 2 and 305 of FIG. 3. An optional switch 854 is provided in the identification circuit so that the resistor is not connected until the switch is closed. The optional switch is preferred to locate behind one of the contact terminals. This optional arrangement allows the user to touch the contact terminals without immediate triggering the voice or visual response. The voice or visual response is generated only when the switch is activated.

Figure 9A:
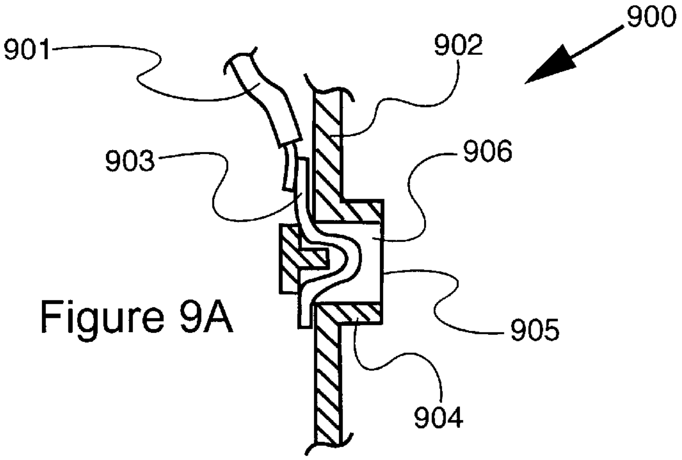
FIG. 9A is a sectional view describing the stopper wall surrounding a contact terminal of the controller side to prevent it from short circuiting with an adjacent contact terminal.
Figure 9B:
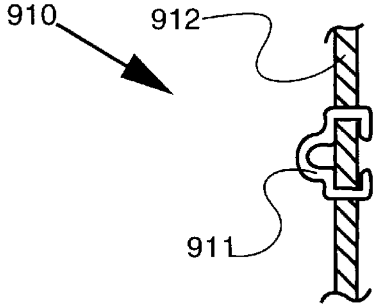
FIG. 9B is a mating contact terminal to be received by the contact terminal of FIG. 9A.

FIG. 9A illustrates a finger contact design structured to prevent short circuit when two finger contacts are in touch with each other. The conductive contact terminal 903 is soldered to a wire 901 connecting to the control compartment. 904 is the protective wall formed around the contact terminal 903 such that it will not be possible to contact any surface with an area bigger than the opening 905. Accordingly the contact terminal 903 will not be possible to contact another contact terminal of identical structure. FIG. 9B illustrates the mating contact terminal having a protruded contact area 911 provided to a target article. The exposure of this protruded area 911 is smaller than the opening 905 and therefore be able to enter the cavity 906 for connecting the contact terminal 903.

Figure 10:
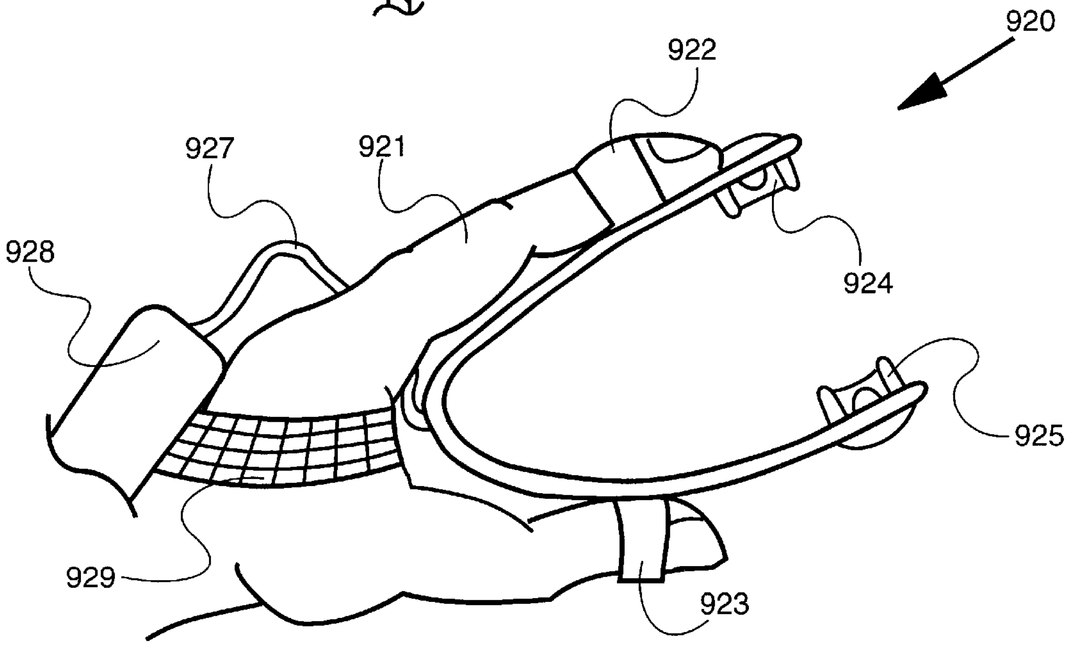
FIG. 10 is an alternate embodiment of the structure holding two contact terminals and allowing these contact terminals to be positioned by the fingers of a human hand.

FIG. 10 illustrates another embodiment 920 having a controller compartment and finger touching structure similar to that of FIG. 1, except that a further connecting frame in the shape of a pair of forceps is provided to hold the finger contact terminals. The motion of the first contact terminal 924 is controlled by the movement of the finger 922. The position of the contact terminal 925 is controlled by the movement of the finger 923. The space in between the contact terminals is structured to be larger than the target article to be connected.

Figure 11:
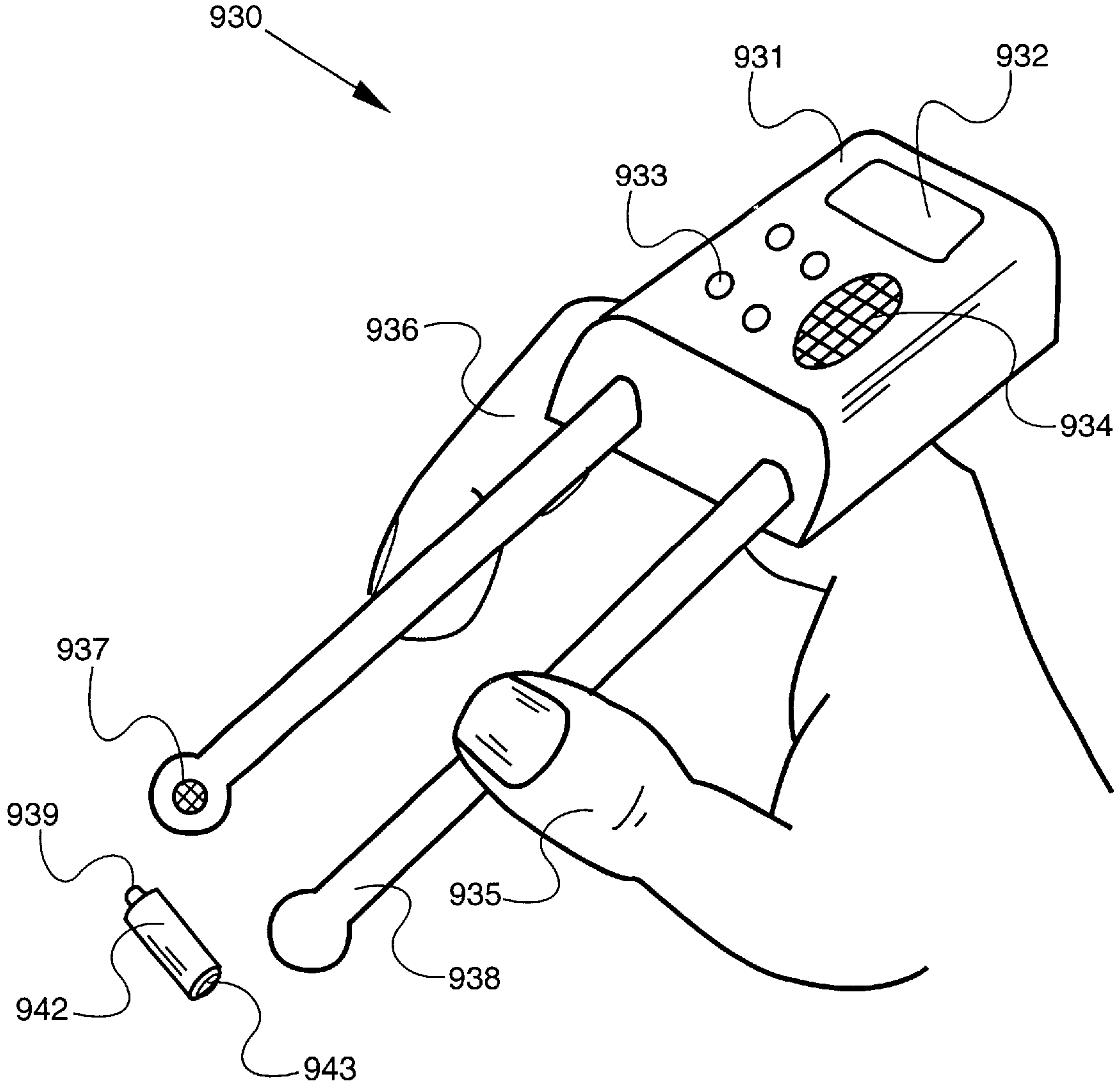
FIG. 11 is another modified embodiment of FIG. 10 structured for testing batteries.

FIG. 11 illustrates an enhanced embodiment structured to test batteries. Instead of attaching the controller compartment to the hand of the user, as shown in FIG. 10, the compartment 931 is connected to the proximal portion of the forceps tongues 937 and 938. The forceps tongues 937 and 938 are made of elastic material with an opening wider than the battery to be measured. Alternately pivots may be provided at the proximal ends of the tongues 937, 938. When a battery 942 is positioned in between the forceps, the tongues 937, 938 are squeeze by the two fingers 935, 936 of the user such that the positive and negative terminals of the batteries 941, 943 are connected to the corresponding contact terminals 939 located at the remote ends of the forceps tongues. Attention is now drawn to the electrical circuit of FIG. 3. The battery voltage is fed to the electrical circuit of the controller through the contact terminals 310 and 311. This voltage is converted into digital values by the analog to digital converter 312 and read by the microcontroller 301. Artificial loading of the battery under test can be achieved by turning on the transistors 328 or 322. Different types of batteries usually required different loading values for determining the current supplying capability of the battery. The voltage drop between a full load and a no load condition is analyzed by the microcontroller 301. The battery testing result is displayed on the LCD panel 303 of FIG. 3, 932 of FIG. 11, signaled by a LED indicator or announced by the speaker 305 of FIG. 3 or 934 of FIG. 11. FIG. 1, FIG. 10 and FIG. 11 shows different structures to attach the contact terminals to the human finger. All other variations of the designs enabling the movement of the human fingers to control the position of two contact terminals, are included in the scope of the disclosure and claims of this patent application. In an alternate embodiment, the motor circuitry of FIG. 7F may be installed inside the control compartment 931. The motor may be linked to a gear down mechanism and/or an artificial load, the running speed of the motor or the torque exerted by the motor indirectly expressing the power driving capability of the battery under test. Traditional methods of expressing torque and rotational speed can then be utilized to indicate the relative strength of the battery under test.

From the foregoing, it should now be appreciated that the applicant has disclosed herein embodiments of a controller device configured to power or interface an electrical powered article of sales. It is intended that the article of sales does not require internal battery as a power source. The electrical power needed by the target article are derived from the controller compartment by finger contacts. Particularly, it should be noted that there are different variations of finger contact designs, different ways to attach a contact terminal to the finger of a human hand and different methods to mount the control compartment to the body of the user. Although detailed embodiments of the invention have been disclosed, it is recognized that variations and modifications, all within the spirit of the invention, will occur to those skilled in the art. It is accordingly intended that all such variations and modifications be encompassed by the appended claims.

I claim:

1. A control apparatus structured for connecting an external article comprising:
   - first and second conductive contact terminals,
   - circuit means connecting between said first and second contact terminals for conducting the electric current flowing through said external article and said first and second conductive contact terminals, when said conductive contact terminals are connected to said external article; and
   - structural means having two elongated rigid arms connecting said contact terminals for controlling the positions of said contact terminals by the finger movement of a human hand.

2. The control apparatus of claim 1 wherein each of said elongated rigid arms has a first end and a second end; the first ends of said elongated arms are connected together and a conductive contact terminal is attached to the second end of each elongated rigid arm.

3. The control apparatus of claim 1 further comprising flexible conductive means to connect between said conductive contact terminals.

4. The control apparatus of claim 1 further comprising adjustable conductive means connecting between said contact terminals.

5. The control apparatus of claim 1 further comprising a compartment connected between said contact terminals, wherein said compartment is configured for attaching to a hand, a wrist, a limb or the body of a user.

6. The control apparatus of claim 1 wherein said electric current comprises an analog signal.

7. The control apparatus of claim 1 further comprising a current limiter to limit the current flowing through said first and second contact terminals.

8. The control apparatus of claim 1 wherein said external article is a battery and said control apparatus further comprising a circuit configured to detect the electrical characteristic of said battery.

9. The control apparatus of claim 1 further comprising stoppers to prevent said conductive contact terminals from touching with each other.

10. The control apparatus of claim 1 further comprising a switch linked to the movement mechanism defining the position of said contact terminals.

11. The articles of claim 1 wherein said external article is a miniature toy representing a life size article.

12. The article of claim 1 wherein said external article represents a wheeled vehicle, a doll, an animal or an electrical tool.

13. The article of claim 1 wherein said external article is a flashlight, a projectile object or a life size electrical tool.

14. The article of claim 1 further comprising energy storage means configured to receive power from said contact terminals when said external article is held by said control apparatus.

15. The article of claim 1 further comprising a switch configured to be triggered by pressing one of said contact terminals.

16. A method to analyze the characteristic of a battery comprising the steps of:

(1) providing a first and second conductive contact terminals;

(2) providing an electrical circuitry suitable for analyzing the characteristics of a battery;

(3) connecting said contact terminals to the electrical circuitry of step (2);

(4) providing a first structural member enabling a first finger of a human hand to control the position of said first conductive contact terminal;

(5) providing a second structural member enabling a second finger of said human hand to control the position of said second conductive contact terminal;

(6) arranging said first and second conductive contact terminals to touch the positive and negative terminals of a battery;

(7) arranging said electrical circuitry to analyze at least a characteristic of said battery and output said analyzed result.

17. The method of claim 16 wherein the analyzed result is output by sound.

18. The method of claim 16 wherein the analyzed result is output by a visual indicator.

19. The method of claim 16 wherein said electrical circuitry comprises a motor and the torque or running speed of the motor represents the strength of the battery.

20. A control apparatus structured for connecting an external article comprising:

first and second conductive contact terminals, circuit means connecting between said first and second contact terminals for conducting the electric current flowing through said external article and said first and second conductive contact terminals, when said conductive contact terminals are connected to said external article;

structural means positioned between said contact terminals for a human hand to control the positions of said contact terminals by finger movement; and a compartment having a display region connected between said conductive contact terminals for displaying graphical or data messages.

21. The control apparatus of claim 20 wherein said external article defines the graphic or data messages to be displayed.

22. A control apparatus structured for connecting an external article comprising:

first and second conductive contact terminals, circuit means connecting between said first and second contact terminals for conducting the electric current flowing through said external article and said first and second conductive contact terminals, when said conductive contact terminals are connected to said external article;

structural means positioned between said contact terminals for a human hand to control the positions of said contact terminals by finger movement; and a compartment having a sound transducer connected between said conductive contact terminals for generating voice message or sound.

23. The control apparatus of claim 22 wherein said external article defines the voice message or sound generated.

24. The control apparatus of claim 22 wherein said electric current is a digital or analog signal.

25. The control apparatus of claim 24 wherein the identity of said external article is represented by said electric current.

26. A control apparatus structured for connecting an external article comprising:

first and second conductive contact terminals, circuit means connecting between said first and second contact terminals for conducting the electric current flowing through said external article and said first and second conductive contact terminals, when said conductive contact terminals are connected to said external article;

structural means positioned between said contact terminals for a human to control the positions of said contact terminals by finger movement; and a compartment having a socket connected between said conductive contact terminals for receiving external power.

27. A control apparatus structured for connecting an external article comprising:

first and second conductive contact terminals;

circuit means connecting between said first and second contact terminals;

structural means positioned between said contact terminals for a human hand to control the positions of said contact terminals by finger movement wherein said conductive contact terminals conduct digital information between said external article and said circuit means when said conductive contact terminals are connected to said external article.

28. A control apparatus structured for connecting an external article comprising:

first and second conductive contact terminals;

circuit means connecting between said first and second contact terminals;

structural means positioned between said contact terminals for a human hand to control the positions of said contact terminals by finger movement wherein said circuit means further comprises an A/D converter or a signal comparator.

29. A control apparatus structured for connecting an external article comprising:

first and second conductive contact terminals, circuit means connecting between said first and second contact terminals for conducting an electric current representing an audio signal to flow through said external article and said first and second conductive contact terminals, when said conductive contact terminals are connected to said external article; and structural means positioned between said contact terminals for controlling the positions of said contact terminals by the finger movement of a human hand.

30. The control apparatus of claim 29 wherein said electric current is an analog signal.

31. A control apparatus structured for connecting an external article comprising:

first and second conductive contact terminals;

circuit means connecting between said first and second contact terminals for conducting the electric current flowing through said external article and said first and second conductive contact terminals, when said conductive contact terminals are connected to said external article;

structural means positioned between said contact terminals for controlling the positions of said contact terminals by the finger movement of a human hand; and a switch configured to be triggered by pressing one of said contact terminals.

32. The control apparatus of claim 31 wherein said switch locates on said external article.

* * * * *